United States Patent [19]
Goodall

[11] Patent Number: 5,155,188
[45] Date of Patent: Oct. 13, 1992

[54] OXIDE COCATALYSTS IN RING OPENING POLYMERIZATION OF POLYCYCLOOLEFINS

[75] Inventor: Brian L. Goodall, Akron, Ohio

[73] Assignee: The B. F. Goodrich Company, Akron, Ohio

[21] Appl. No.: 464,071

[22] Filed: Jan. 12, 1990

Related U.S. Application Data

[63] Continuation-in-part of Ser. No. 290,345, Dec. 29, 1988, abandoned.

[51] Int. Cl.⁵ .............................................. C08G 61/08
[52] U.S. Cl. ....................................... 526/165; 526/113; 526/128; 526/138; 526/142; 526/127; 526/161; 526/282; 526/283; 264/328.6; 264/331.13
[58] Field of Search .............. 526/127, 281, 161, 165, 526/283, 308, 113, 128, 138, 142, 282

[56] References Cited

U.S. PATENT DOCUMENTS

| | | | |
|---|---|---|---|
| 4,080,491 | 3/1978 | Kobayashi et al. | 526/137 |
| 4,481,344 | 11/1984 | Newburg | 526/283 |
| 4,943,621 | 7/1990 | Janda et al. | 526/283 X |

FOREIGN PATENT DOCUMENTS 52-63298  5/1977  Japan .................................. 526/281

Primary Examiner—Fred Teskin
Attorney, Agent, or Firm—George A. Kap; Thoburn T. Dunlap

[57] ABSTRACT

This invention pertains to the use of a novel cocatalyst in ring opening polymerization of a cycloolefin containing a norbornene moiety in conjunction with a metathesis catalyst, said cocatalyst is selected from aluminum-siloxalanes, aluminum-stannoxalanes, aluminum-germoxalanes, aluminum-plumboxalanes, dialuminoxanes, and mixtures thereof.

33 Claims, No Drawings

OXIDE COCATALYSTS IN RING OPENING POLYMERIZATION OF POLYCYCLOOLEFINS

REFERENCE TO RELATED APPLICATION

This is a continuation-in-part of application Ser. No. 290,345 filed Dec. 29, 1988, and entitled "Novel Oxide Cocatalysts In Ring Opening Polymerization Of Polycycloolefins" now abandoned.

BACKGROUND OF THE INVENTION

Ring opening polymerization with a metathesis catalyst system of cycloolefins is well known. The cycloolefins for purposes herein are monomers which contain a norbornene group and generally include norbornene compounds, dicyclopentadiene, and similar polycycloolefin monomers. The metathesis catalyst system includes a catalyst and a cocatalyst. The catalyst is generally selected from molybdenum and tungsten compounds whereas the cocatalyst is selected from organometallics such as alkylaluminums and alkylaluminum halides.

U.S. Pat. No. 4,400,340 to Klosiewicz describes a tungsten-containing catalyst such as tungsten halide or tungsten oxyhalide. The catalyst is suspended in a solvent to prevent it from prepolymerizing a monomer to which is added an alcoholic or a phenolic compound to facilitate solubilization of the tungsten catalyst in the monomer and a Lewis base or a chelant to prevent premature polymerization of the solution of the tungsten compound and the monomer. The amount of the tungsten compound is 0.1 to 0.7 mole per liter of solvent. The weight ratio of the tungsten compound to the alcoholic or phenolic compound is 1:1 to 1:3, and the amount of the Lewis base or chelant is 1 to 5 moles thereof per mole of the tungsten compound. Treatment of the tungsten compound should be carried out in the absence of moisture and air to prevent deactivation the tungsten compound catalyst. The catalyst must be treated in the manner outlined above in order to render it soluble in the cycloolefin monomer. The cocatalyst in this patent is disclosed as being selected from tetrabutyltin and alkylaluminum compounds such as alkylaluminum dihalide or dialkylaluminum halide where the alkyl group contains 1 to 10 carbon atoms. The preferred alkyl group is ethyl with diethylaluminum chloride being the most preferred cocatalyst. These cocatalysts are sensitive to air and moisture but are readily soluble in the cycloolefin monomers.

U.S. Pat. No. 4,380,617 to Minchak et al discloses metathesis catalyst systems for polymerizing cycloolefins. The catalysts are defined as organoammonium isopolymolybdates and organoammonium isopolytungstates and these catalysts are soluble in cycloolefins and are insensitive to air and moisture. The cocatalysts in this patent are similar to the cocatalysts disclosed in U.S. Pat. No. 4,400,340 and are generally selected from organometallics, particularly alkylaluminum halides although in a less preferred embodiment, other metals can be used in place of aluminum such as lithium, magnesium, boron, lead, zinc, tin, silicon, and germanium. Also, metallic hydrides can be used in whole or in part for the organometallic cocatalysts. Alkylaluminum and the corresponding organometallic compounds can also be used as cocatalysts herein.

U.S. Pat. No. 4,426,502 discloses the use of alkoxyalkylaluminum halides or aryloxyalkylaluminum halides as cocatalysts in metathesis catalyst systems to polymerize cycloolefin monomers. These cocatalysts are disclosed as especially useful in conjunction with organoammonium isopolytungstate and isopolymolybdate catalysts in polymerization of cycloolefins or norbornene-type monomers. By modifying the alkylaluminum halide cocatalysts to alkoxy or aryloxy alkylaluminum halides, the reducing power of the cocatalysts is thus lowered to provide adequate pot life for mixing various ingredients at room temperature, and for work interruptions, before initiation of polymerization and subsequent rapid polymerization.

SUMMARY

Polymerization of cycloolefins containing a norbornene group is carried out in the presence of a metathesis catalyst system composed of a metathesis catalyst and a metathesis cocatalyst selected from siloxalane, stannoxalane, germoxalane, plumboxalane, and aluminoxane cocatalysts which contain at least one aluminum molecule. These cocatalysts are generally soluble in inert solvents and in the cycloolefins but are sensitive to oxygen and moisture.

DETAILED DESCRIPTION OF THE INVENTION

This invention resides in the use of modified cocatalysts in the ring opening polymerization of cycloolefins containing a norbornene group. These cocatalysts are soluble in hydrocarbon solvents and in the cycloolefin monomers which contain a norbornene group. Metathesis catalysts, particularly those selected from molybdenum and tungsten compounds, together with other ingredients, can be used in conjunction with the modified cocatalysts described herein to polymerize cycloolefins containing a norbornene group by solution or bulk polymerization.

Suitable cocatalysts herein are defined by the following formula:

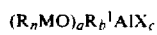

$$(R_nMO)_aR_b^1AlX_c$$

where:

M is silicon (Si), tin (Sn), germanium (Ge), lead (Pb), or aluminum (Al);

R and $R^1$ are individually selected from alkyl, alkylene, alkynyl, aryl, aralkyl, aralkylene, and aralkynyl groups containing 1-18 carbon atoms, preferably, R and $R^1$ are individually selected from alkyl groups of 1 to 3 carbon atoms and phenyl groups, however, when M is aluminum, one of the R groups can be a halide;

X is selected from chlorine, fluorine, bromine, or iodine, but preferably chlorine;

a = ½ to 2½, preferably 1 to ¾ b = ¼ to 2, preferably ½ to 1 c = 0 to 2, preferably ¾ to 1¼ a + b + c = 3 n = 3 except n is 2 when M is aluminum

Alcohols and phenols are described as cocatalyst modifiers by Minchak in U.S. Pat. No. 4,426,502. These cocatalysts are defined as $(RO)_aR^1AlX_c$, where the various parameters are defined above. Replacing the (OR) group with a siloxy group $(OSiR_3)$ also generates an active cocatalyst system in combination with a metathesis catalyst component. The siloxalanes, described herein as suitable cocatalysts, can be prepared by reacting an appropriate silyl alcohol with an alkyl aluminum.

A general reaction shown below for triethyl aluminum and trimethysilyl alcohol demonstrates preparation of a siloxalane cocatalyst:

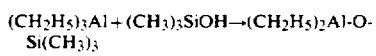

$(CH_2H_5)_3Al + (CH_3)_3SiOH \rightarrow (CH_2H_5)_2Al\text{-}O\text{-}Si(CH_3)_3$ The resulting cocatalyst is diethylaluminum trimethylsiloxalane. Alternatively, a triethylaluminum can be reacted with octamethylcyclotetrasilane to produce diethylaluminum dimethylethyl siloxalane.

Other preferred cocatalysts include diisobutylaluminum trimethylsiloxalane, ethylchloroaluminum trimethylsiloxalane, and diethylaluminum triphenylsiloxalane.

A preparation of the siloxalanes is described in U.S. Pat. No. 3,969,332, which is incorporated herein by reference.

Similarly, stannoxalane cocatalysts can be synthesized by reacting an alkyltin hydroxide, such as trimethyl or triphenyltin hydroxide, with an alkylaluminum, such as triethylaluminum, to produce a stannoxalane cocatalyst, in the following manner:

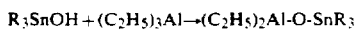

$R_3SnOH + (C_2H_5)_3Al \rightarrow (C_2H_5)_2Al\text{-}O\text{-}SnR_3$

The cocatalysts containing germanium or lead are prepared in the same way as the siloxalanes and stannoxalanes. The cocatalysts containing another aluminum atom, the dialuminoxanes, are prepared differently by reacting an alkyl aluminum or an alkyl aluminum halide, as follows:

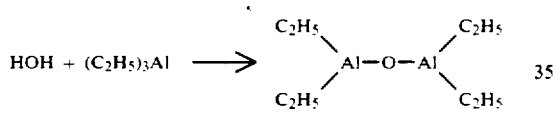

The new cocatalysts are particularly efficient and allow for the use of halogen-free cocatalysts in combination with metathesis catalysts.

The catalysts suitable herein are metathesis catalysts which include halides, oxyhalides, and oxides of molybdenum, tungsten, and tantalum compounds, and organoammonium molybdates and tungstates. The latter catalysts are insensitive to oxygen and moisture in the environment.

Preferred catalysts are organoammonium isopolymolybdates and tungstates that are selected from those defined as follows:

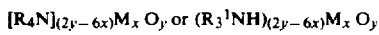

$[R_4N]_{(2y-6x)}M_xO_y$ or $(R_3^1NH)_{(2y-6x)}M_xO_y$ where O represents oxygen; M represents either molybdenum or tungsten; x and y represent the number of M and O atoms in the molecule based on the valence of +6 for molybdenum, +6 for tungsten, and −2 for oxygen; and the R and $R^1$ radicals can be same or different and are selected from hydrogen, alkyl, and alkylene groups each containing from 1 to 20 carbon atoms, and cycloaliphatic groups each containing from 5 to 16 carbon atoms. All of the R and $R^1$ radicals cannot be hydrogens nor be small in the number of carbon atoms since such a condition will render the molecule essentially insoluble in hydrocarbons and most organic solvents. In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the $R^1$ radicals are selected from alkyl groups each containing from 1 to 18 carbon atoms wherein the sum of carbon atoms on all of the $R^1$ radicals is from 15 to 54, more preferably from 21 to 42.

The norbornene-type monomers or cycloolefins that can be polymerized in accordance with the process described herein are characterized by the presence of the norbornene group, defined structurally by the following formula I:

(I)

Pursuant to this definition, suitable norbornene-type monomers include substituted and unsubstituted norbornenes, dicyclopentadienes, dihydrodicyllopentadienes, trimers of cyclopentadiene, and tetracyclododecenes. Contemplated herein are also lower alkyl norbornenes and lower alkyl tetracyclododecenes wherein the lower alkyl group contains 1 to about 6 carbon atoms. Preferred monomers of the norbornene-type are those defined by the following formulas II and III:

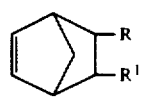

(II)

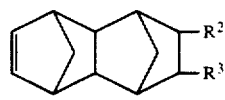

(III)

where R and $R^1$ are independently selected from hydrogen, alkyl groups of 1 to 20 carbon atoms, and saturated and unsaturated hydrocarbon cyclic groups formed by R and $R^1$ together with the two ring carbon atoms connected thereto containing 4 to 7 carbon atoms. In a preferred embodiment, R and $R^1$ are independently selected from hydrogen, alkyl groups of 1 to 3 carbon atoms, and monounsaturated hydrocarbon cyclic groups containing 5 carbon atoms, the cyclic group being formed by R and $R^1$ as well as by the two carbon atoms connected to R and $R^1$. In reference to formula III, $R^2$ and $R^3$ are independently selected from hydrogen and alkyl groups containing 1 to 20 carbon atoms, preferably 1 to 3 carbon atoms. Examples of preferred monomers referred to herein include dicyclopentadiene, trimers and tetramers of cyclopentadiene; methyltetracyclododecene; 2-norbornene and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene; vinyl norbornene; and ethylidene norbornene.

The monomer or mixture of norbornene-type monomers can contain up to about 20% by weight thereof of at least one other polymerizable monomer. Such other polymerizable monomers are preferably selected from monocycloolefins containing 4 to 12 carbon atoms, preferably 4 to 8 carbon atoms, examples of which include cyclobutene, cyclopentene, cyclopentadiene, cycloheptene, cyclooctane, 1,5-cyclooctadiene, cyclodecene, cyclododecene, cyclododecadiene, and cyclododecatriene. As should be apparent, cycloolefins that cannot be polymerized by ring opening, i.e., cyclohexene and derivatives thereof, are not employed in the polymerization process of this invention except as solvents.

In solution polymerization, a hydrocarbon reaction solvent is mixed with a cycloolefin monomer or a mixture thereof, with or without other polymerizable monomers, and the mixture of the monomer and solvent is charged into a reactor. A molecular weight modifier selected from nonconjugated acyclic olefins is then charged into the reactor followed by the cocatalyst of the present invention and at least one molybdate or tungstate compound catalyst that is soluble in the cocatalyst and the monomer. The reaction can be conducted at 0° to 100° C., preferably 20° to 80° C., or at ambient temperature and carried out to completion in less than two hours and shortstopped by addition of an alcohol. The resulting product is a smooth, viscous polymer cement. Upon removal of the solvent, the polymer is a thermoplastic, solid material.

Suitable solvents for solution polymerization include aliphatic and cycloaliphatic hydrocarbon solvents containing 4 to 10 carbon atoms such as pentane, hexane, heptane, octane, cyclohexane, cyclohexene, cyclooctane and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. Cyclohexane was found to be an excellent solvent. The polymer need not be soluble in the solvent. The solvent may be added at any point in the charging procedure, but a portion, preferably 0.1 to 10% of the total solvent, is used to dissolve the catalyst and the remainder added before the catalyst solution. Generally, $\frac{1}{2}$ to 2 liters of solvent is used per 100 grams of monomer.

A solution polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. The activator may be employed in a range from about 0 moles to about 3 moles per mole of the cocatalyst, more preferably from about 0 to about 1 mole per mole. The activator may be added at any point in the charge procedure but it is more preferably added last, or with the catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Examples of suitable acyclic olefins include 1-olefins, 2-olefins, 3-olefins, and nonconjugated triolefins. More preferably, the nonconjugated acyclic olefin is selected from the group consisting of 1-olefins and 2-olefins containing 3 to 8 carbon atoms such as 1-butene, 3-methyl-1-butene, 2-pentene, 4-methyl-2-pentene, and the like. Compounds not having hydrogen atoms substituted on double-bonded carbons are unreactive in this invention.

The nonconjugated acyclic olefin can be used in a molar ratio to total monomer charge of from about 0.0001 to about 1 mole per mole of the monomer charge. The nonconjugated acyclic olefin can be charged directly or in solution at any point in the charge procedure, but it is more preferably charged along with the monomers. When charged last, the nonconjugated acyclic olefin is preferably charged before reaction begins.

The monomer can be added at any point in the charging procedure. Normally, however, the monomer, solvent and nonconjugated acyclic olefin are added first to the reactor vessel. These ingredients can be added separately or as a mixture of ingredients. Next, the cocatalyst and the catalyst are added separately, usually in the hydrocarbon solvent described above. The metathesis catalyst component is added following addition of the cocatalyst component although the order can be reversed. Completion of the polymerization reaction is indicated by the disappearance of the monomer in the charge, as monitored by gas chromatography.

Bulk polymerization is carried out in absence of a solvent by polymerizing cycloolefin monomer or a mixture thereof by means of a metathesis catalyst system wherein the catalyst component is a molybdate or tungstate compound and the cocatalyst component is a cocatalyst of this invention. The monomer can be formed into a hard object in a single step by means of reaction injection molding (RIM) process wherein polymerization takes place in a mold. Examples of such objects include business machine housings, furniture, window frames, automobile and recreation vehicle parts, and the like.

Since the metathesis catalysts described herein are soluble in a norbornene-type monomer or a mixture thereof, the polymerization can be carried out in absence of a solvent and other additives used in solution polymerization. Since the cocatalysts are also soluble in such monomers, this, of course, facilitates polymerization in bulk and makes it possible to polymerize the norbornene-type monomer(s) by reaction injection molding process.

The catalysts, or mixtures thereof, are employed at a level of 0.01 to 50 millimoles of the metal(s) per mole of total monomer(s), preferably 0.1 to 10 millimoles. The molar ratio of the cocatalyst to the catalyst is not critical and can range from about 200:1 or more to 1:10, preferably 10:1 to 2:1 the metal(s) in the cocatalyst to the combined amount of molybdenum or tungsten in the catalyst.

If the cocatalyst does not contain any halide or if more halogen is desired, then a halogen source is used. Suitable halogen source is selected from halosilanes which are used in amount of 0.05 to 10 millimoles per mole of the norbornene-type monomer, preferably 0.1 to 2 millimoles per mole of the monomer. Specific examples of preferred halogen source are chlorosilanes such as dimethylmonochlorosilane, dimethyldichlorosilane, diphenyldichlorosilane, tetrachlorosilane, and the like. In bulk polymerization such as reaction injection molding process, conversion of in excess of 95%, preferably in excess of 98% can be attained, measured by the thermal gravimetric procedure.

In order to further illustrate the invention described herein, the following examples are presented that demonstrate certain aspects of the invention herein in greater detail. It is to be understood, however, that the examples are presented for illustrative purposes and not in any sense are to limit the scope of the invention herein, the scope of which is defined by the appended claims.

EXAMPLE 1

This example demonstrates preparation of the siloxalane or aluminum-siloxalane cocatalyst which is believed to have the following formula:

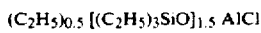

$(C_2H_5)_{0.5} [(C_2H_5)_3SiO]_{1.5} AlCl$

The monomer mixture used herein was 92.5 weight parts dicyclopentadiene (DCPD) and 7.5 weight parts ethylidene norbornene (ENB).

The preparation procedure involved dissolving liquid triethyl silanol $[(C_2H_5)_3SiOH]$ in a liquid DCPD/ENB monomer mixture in a bottle under nitrogen to give a 1 molar solution or solution(A). Diethylaluminumchloride in solid form was dissolved in the DCPD/ENB monomer mixture to give a 0.5 molar solution or solution(B). Then, 0.9 ml of solution(A) was added with mixing to 25.4 ml of DCPD/ENB to make solution(C). Then, 1.2 ml of solution(B) was added with mixing to solution(C) which resulted in a colorless solution of the cocatalyst in the monomer mixture. The resulting cocatalyst solution became warm on mixing and the reaction was accompanied by evolution of ethane gas.

EXAMPLE 2

This example demonstrates preparation of the stannoxalane or aluminum-stannoxalane cocatalyst which is believed to have the following formula:

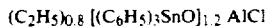

$(C_2H_5)_{0.8} [(C_6H_5)_3SnO]_{1.2} AlCl$

The monomer mixture used herein was that of dicyclopentadiene (DCPD) and ethylidene norbornene (ENB) in 92.5/7.5 weight ratio.

This cocatalyst was prepared in a similar manner to that of the aluminum-siloxalane cocatalyst of Example 1 by dissolving solid triphenyltin hydroxide in the DCPD/ENB mixture under nitrogen to give a 1 molar solution or solution(A). Then, solid diethylaluminum chloride was also dissolved in the DCPD/ENB monomer mixture to give a 0.5 molar solution or solution(B). Then, 0.9 ml of solution(A) was added to 25.4 mls of the DCPD/ENB monomer mixture to yield solution(C). Finally, 1.2 mls of solution(B) was added with agitation to solution(C) and a colorless cocatalyst solution in the monomer mixture was obtained. The solution became warm on mixing and the reaction was accompanied by evolution of ethane gas.

EXAMPLE 3

This example demonstrates polymerization of a monomer mixture of dicyclopentadiene (DCPD) and ethylidene norbornene (ENB) in weight ratio of 92.5/7.5 with an aluminum-siloxalane cocatalyst of this invention.

Three polymerizations were conducted with triethylsilanol, designated below as (SiOH), silicon tetrachloride (SiCl₄), tris(tridecyl)ammonium molybdate designated as AM below which has the formula [N(C₁₃H₂₇)H]₃ Mo₈O₂₆; and diethylaluminum chloride (DEAC). Order of addition of the materials and amounts in milliliters (mls) is given below:

| Order of Addition and Material | A | B | C |
|---|---|---|---|
| DCPD/ENB | 12.7 | 25.4 | 25.4 |
| SiOH, 1.0M | 0.333 | 0.84 | 0.84 |
| DEAC, 0.5M | 0.6 | 1.2 | 1.2 |
| SiCl₄, 0.25M | 0.6 | 1.2 | 1.2 |
| AM, 0.1N | 0.75 | 1.5 | 1.5 |
| Wt. Ratio SiOH/DEAC | 1.1/1 | 1.4/1 | 1.4/1 |

The materials given above in solution form, were prepared in the monomer mixture of DCPD/ENB, in which they are soluble.

It should be apparent that the first three steps noted above involve preparation of the cocatalyst of this invention.

The materials were added in the given order to 7 oz. bottles provided with injection caps. The bottles were vigorously agitated after each addition and each addition was made in quick succession. Bottle A was allowed to remain at room temperature while bottle B was allowed to stand at room temperature for about 10 minutes and then was placed in an oven maintained at 140° C.

The contents of bottle A polymerized immediately into a dark brown mass. Contents of bottle B polymerized within a few minutes after being placed in the 140° C. oven.

Bottle C was allowed to stand at ambient temperature for 3 hours after which time no reaction had occurred. The bottle was then placed in an oven at 140° C. after which polymerization to a solid mass occurred within a few minutes. This example serves to illustrate the excellent pot-life properties of the catalyst mixtures of the current invention.

EXAMPLE 4

This example demonstrates polymerization of the monomer mixture of dicyclopentadiene (DCPD) and ethylidene norbornene (ENB) in weight ratio of 92.5/7.5 using an aluminum-stannoxalane cocatalyst of this invention.

Procedure involved the addition of 25.4 mls of the DCPD/ENB monomer mixture to a bottle followed by 0.72 ml of a 1 molar solution of triphenyltin hydroxide ](C₆H₅)₃SnOH], and 1.2 mls of a 0.5 molar solution of diethylaluminum chloride (DEAC). This procedure is the same as that for preparation of the novel cocatalyst of this invention.

Preparation of the cocatalyst was followed by addition of 1.2 mls of 0.25M solution of silicon tetrachloride and 1.5 mls of a 0.1N solution of tri(tridecyl)ammonium molybdate catalyst. Weight ratio of the triphenyltin hydroxide to DEAC was 1.2/1.

Upon addition of the amine molybdate catalyst, solution polymerized immediately into a solid mass of a dark brown color.

EXAMPLE 5

This example demonstrates preparation of the aluminoxane or dialuminoxane cocatalyst and polymerization therewith of a monomer mixture of dicyclopentadiene (DCPD) and ethylidene norbornene (ENB) in weight ratio of 92.5/7.5. Preparation of the cocatalyst was under nitrogen.

To 28.5 g of the monomer mixture of DCPD and ENB in a reaction bottle was added 6.0 mg (0.33 m mol) of distilled water. The resulting solution was shaken to ensure good mixing and it was then added to a 0.5 molar solution of diethylaluminum chloride (DEAC) in the monomer mixture. The resulting dialuminoxane cocatalyst is believed to have the following structural formula:

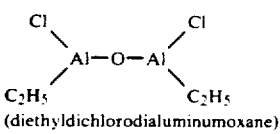
(diethyldichlorodialuminumoxane)

To the above solution in the reaction bottle was added 1.25 ml (0.31 m mol) of a 0.25 molar solution of silicon tetrachloride in the monomer mixture. On addition of 1.6 ml. of the 0.1 molar amine molybdate catalyst solution of Example 4 in the monomer mixture with shaking, polymerization in the reaction bottle ensued almost immediately. Polymerization was evident from the color change to dark brown of the polymerization mixture, a high exotherm, and thickening of the contents of the reaction bottle. The contents of the bottle was rapidly converted to a solid mass.

When the above polymerization was run with unmodified DEAC, what was obtained was encapsulation of the catalyst and incomplete conversion of the monomers.

EXAMPLE 6

This example demonstrates that a siloxane (disiloxane) cocatalyst does not work here in that it does not polymerize a cycloolefin monomer containing a norbornene group. The disiloxane cocatalyst used here had the following structural formula:

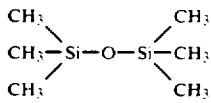

The cocatalyst was tested by placing 12.7 grams (g) of the monomer mixture of 92.5 weight percent dicyclopentadiene and 7.5 weight percent ethylidenenorbornene into a sealed, nitrogen-purged 7-ounce pop bottle followed by syringe-addition of the following components in the order listed below:

(a) 0.6 ml of 0.25 molar solution in the monomer mixture of hexamethyldisiloxane cocatalyst,

[(CH$_3$)$_3$Si-O-Si(CH$_3$)$_3$] (0.15 m mols), (b) 0.6 ml of 0.25 molar solution in the monomer mixture of silicon tetrachloride (0.15 m mols), and
(c) 0.75 ml of 0.1 normal solution in the monomer mixture of the organoammonium molybdate catalyst,

[((C$_{13}$H$_{27}$)$_3$NH)$_4$Mo$_8$O$_{26}$] (0.075 m mols).

At ambient temperature, the bottle contents were of a deep blue-green color and there was no evidence of polymerization even after 24 hours. Evidence of polymerization is thickening of the mixture. Lack of polymerization was an indication that the cocatalyst was completely ineffective.

EXAMPLE 7

This example demonstrates that a stannoxane (distannoxane) cocatalyst does not work here in that it does not polymerize a cycloolefin monomer containing a norbornene group. The distannoxane cocatalyst had the following structural formula:

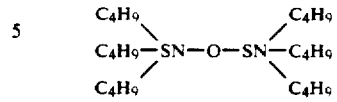

The above cocatalyst was tested in the same manner as described in Example 6, above. The final mixture, however, was dark green in color and absolutely no reaction occurred, indicating that the cocatalyst was completely ineffective.

I claim:

1. A process for preparing a polymer by ring opening bulk polymerization in the presence of a metathesis catalyst system containing a methathesis catalyst component selected from the group consisting of the halides, oxyhalides and oxides of molybdenum, tungsten and tantalum; organoammonium isopolymolybdates, organoammonium isopolytungstates, and mixtures of said catalysts and a metathesis cocatalyst component selected from the group consisting of aluminum-stannoxalanes, aluminum-germoxalanes, aluminum-plumboxalanes, dialuminoaxanes, and mixtures of said cocatalysts, with the proviso that when said cocatalyst does not contain a halide a halogen source is present, said process comprising the in-mold polymerization of a cycloolefin monomer containing at least one norbornene group, or a mixture of said monomer(s), to monomer conversion in excess of 95% as measured by thermogravimetric analysis; wherein the molar ratio of said cocatalyst on the basis of a metal(s) therein to said catalyst on the basis of a metal(s) therein is about 200:1 to 1:10.

2. Process of claim 1 wherein said catalyst component is utilized in the amount from about 0.01 to 50 millimoles of molybdenum and/or tungsten per mole of said monomer or mixtures thereof; and said monomer is selected from the following monomers, and mixtures thereof:

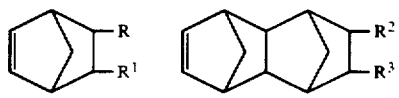

where R and R$^1$ are independently selected from hydrogen, alkyl, and aryl groups of 1 to 20 carbon atoms, and saturated and unsaturated cyclic groups containing 4 to 7 carbon atoms formed by R and R$^1$ and the two ring carbon atoms connected thereto; where R$^2$ and R$^3$ are independently selected from hydrogen and alkyl groups of 1 to 20 carbon atoms.

3. Process of claim 2 wherein in said monomer(s), R and R$^1$ are independently selected from hydrogen, alkyl groups of 1 to 3 carbon atoms, and monounsaturated unsubstituted hydrocarbon cyclic groups containing 5 carbons with the cyclic groups being formed by R and R$^1$ as well as by the two carbon atoms connected to R and R$^1$; and R$^2$ and R$^3$are independently selected from hydrogen and alkyl groups containing 1 to 3 carbon atoms.

4. Process of claim 1 wherein said catalyst component is selected from halides, oxyhalides and oxides of molybdenum and tungsten, and mixtures thereof; and wherein said cocatalyst component is defined as follows:

$$(R_nMO)_a R_b{}^1AlX_c$$

where: M is metal selected from tin, germanium, lead, or aluminum;
R and $R^1$ are individually selected from alkyl, alkylene, alkynyl, aryl, aralkyl, aralkylene, and aralkynyl containing 1-18 carbon atoms, and when M is aluminum, one R group can also be selected from halides;
X is fluorine, bromine, chlorine or iodine
a is $\frac{1}{2}$ to $2\frac{1}{2}$
b is $\frac{1}{4}$ to 2
c is 0 to 2, and
$a+b+c=3$
$n=3$ except n is 2 when M is aluminum.

5. Process of claim 4 wherein R and $R^1$ in said cocatalyst are individually selected from alkyl groups containing 1 to 3 carbon atoms and phenyl groups;
X is chlorine; "a" is 1 to $1\frac{3}{4}$; "b" is $\frac{1}{2}$ to 1; and "c" is $\frac{3}{4}$ to $1\frac{1}{4}$.

6. Process of claim 1 wherein said halogen source is selected from dimethylmonochlorosilane, dimethyldichlorosilane, diphenyldichlorosilane, tetrachlorosilane, and mixtures thereof.

7. Process of claim 6 wherein said halogen source is utilized in an amount from about 0.05 to about 10 millimoles per mole of said monomers.

8. A process for preparing a polymer by ring opening bulk polymerization in the presence of a metathesis catalyst system comprising the in-mold polymerization of a cycloolefin monomer containing a norbornene group, or a mixture thereof, to monomer conversion in excess of 95%, measured by thermogravimetric analysis, in the presence of an effective amount of a metathesis catalyst component and an effective amount of a methathesis cocatalyst component; said catalyst component is selected from the group consisting of the halides, oxyhalides, and oxides of molybdenum, tungsten, and tantalum; organoammonium isopolymolybdates, organoammonium isopolytungstates and mixtures of said catalysts; said cocatalyst component is selected from aluminum-stannoxalanes, aluminum-germoxalanes, aluminum-plumboxalanes, dialuminoxanes, and mixtures of said cocatalysts with the proviso that when said cocatalyst does not contain a halide a halogen source is present; and said monomer is selected from norbornene, methylnorbornene, vinyl norbornene, ethylidenenorbornene, tetracyclododecene, methyl tetracyclododecene, dicyclopentadiene, trimer of cyclopentadiene, tetramer of cyclopentadiene, and mixtures thereof; the amount of said catalyst being about 0.01 to 50 millimoles of molybdenum, tungsten or tantalum per mole of total cycloolefin monomer and the molar ratio of said cocatalyst as metal(s) to said catalyst as molybdenum, tungsten or tantalum is in the range of about 200:1 to 1:10.

9. Process of claim 8 wherein said cocatalyst component is defined as follows:

$$(R_nMO)_a R_b{}^1AlX_c$$

where:
M is metal selected from tin, germanium, lead, or aluminum;
R and $R^1$ are individually selected from alkyl, alkylene, alkynyl, aryl, aralkyl, aralkylene, and aralkynyl containing 1-18 carbon atoms, and when M is aluminum, one R group can also be selected from halides;
X is fluorine, bromine, chlorine or iodine
a is $\frac{1}{2}$ to $2\frac{1}{2}$
b is $\frac{1}{4}$ to 2
c is 0 to 2, and
$a+b+c=3$
$n=3$ except n is 2 when M is aluminum.

10. Process of claim 9 wherein R and $R^1$ of said cocatalyst component are individually selected from alkyl groups containing 1 to 3 carbon atoms and phenyl groups;
X is chlorine; "a" is 1 to $1\frac{3}{4}$; "b" is $\frac{1}{2}$ to 1; and "c" is $\frac{3}{4}$ to $1\frac{1}{4}$.

11. Process of claim 8 wherein said halogen source is selected from dimethylmonochlorosilane, dimethyldichlorosilane, diphenyldichlorosilane, tetrachlorosilane, and mixtures thereof.

12. Process of claim 11 wherein said halogen source is utilized in an amount from about 0.05 to about 10 millimoles per mole of said monomers.

13. Process for preparing a polymer by ring opening polymerization in the presence of a metathesis catalyst system comprising the step of polymerizing a cycloolefin monomer containing a norbornene group, or a mixture thereof, in the presence of an effective amount of a metathesis catalyst component and an effective amount of a metathesis cocatalyst component, said cocatalyst component is selected from aluminum-stannoxalanes, aluminum-germoxalanes, aluminum-plumboxalanes, and mixtures of said cocatalysts.

14. Process of claim 13 wherein said cocatalysts are defined as follows:

$$(R_nMO)_a R_b{}^1AlX_c$$

wherein:
M is tin, germanium, or lead;
R and $R^1$ are individually selected from alkyl, alkylene, alkynyl, aryl, aralkyl, aralkylene, and aralkynyl containing 1-18 carbon atoms;
X is fluorine, bromine, chlorine or iodine
a is $\frac{1}{2}$ to $2\frac{1}{2}$
b is $\frac{1}{4}$ to 2
c is 0 to 2, and
$a+b+c=3$
$n=3$ 15. Process of claim 14 wherein R and $R^1$ of said cocatalyst component are individually selected from alkyl groups containing 1 to 3 carbon atoms and phenyl groups;
X is chlorine; "a" is 1 to $1\frac{3}{4}$; "b" is $\frac{1}{2}$ to 1; and "c" is $\frac{3}{4}$ to $1\frac{1}{4}$; and said polymerization is in bulk.

16. Process of claim 15 wherein said catalyst component is selected from organoammonium isopolymolybdates and organoammonium isopolytungstates defined as follows:

$$[R_4N]_{(2y-6x)}M_x O_y \text{ or } (R_3{}^1NH)_{(2y-6x)}M_x O_y$$

where O represents oxygen; M represents either molybdenum or tungsten; x and y represent the number of M and O atoms in the molecule based on the valence of +6 for molybdenum, +6 for tungsten, and −2 for oxygen; and the R and $R^1$ radicals can be same or different and are selected from hydrogen, alkyl, and alkylene groups each containing from 1 to 20 carbon atoms, and cycloaliphatic groups each containing from 5 to 16 carbon atoms; the sum of carbon atoms in R and R¹ radicals is large enough to render to catalyst component soluble in said monomer or a mixture thereof.

17. Process of claim 16 wherein in the formula for the catalyst components, R radicals are individually selected from alkyl groups of 1 to 18 carbon atoms and the sum of the carbons in all R radicals is 20 to 72; and R¹ radicals are individually selected from alkyl groups of 1 to 18 carbon atoms and the sum of the carbons in all R¹ radicals is 15 to 54.

18. Process of claim 17 wherein the sum of the carbons in all R radicals is 25 to 48 and the sum of the carbons in all R¹ radicals is 21 to 42; wherein said process is carried out in bulk; and wherein monomer conversion is in excess of 98%, measured by thermogravimetric analysis.

19. Process of claim 18 which also includes the step of adding a halogen source in amount of 0.1 to 2 millimoles per mole of said monomer(s).

20. Process of claim 19 wherein said halogen source is selected from dimethylmonochlorosilane, dimethyldichlorosilane, diphenyldichlorosilane, tetrachlorosilane, and mixtures thereof; and wherein monomer conversion is in excess of 98%.

21. Process of claim 20 which includes the step of mixing multiple streams containing said catalyst, said cocatalyst, said halogen source, and said monomer(s) to produce a reactive mixture, and the step of injecting said reactive mixture into a mold where said polymerization takes place to produce a thermoset polymer.

22. A process for preparing a polymer by ring opening bulk polymerization in the presence of a metathesis catalyst system containing a metathesis catalyst component and a metathesis cocatalyst component, said catalyst component is selected from organoammonium isopolymolybdates and organoammonium isopolytungstates defined as follows:

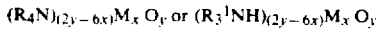

where O represents oxygen; M represents either molybdenum or tungsten; x and y represent the number of M and O atoms in the molecule based on the valence of +6 for molybdenum, +6 for tungsten, and −2 for oxygen; and the R and R¹ radicals can be same or different and are selected from hydrogen, alkyl, and alkylene groups each containing from 1 to 20 carbon atoms, and cycloaliphatic groups each containing from 5 to 16 carbon atoms; the sum of carbon atoms in R and R¹ radicals is large enough to render the catalyst component soluble in hydrocarbons and organic solvents, said cocatalyst component is selected from the group consisting of aluminum-stannoxalanes, aluminum-germoxalanes, aluminum-plumboxalanes, dialuminoxanes and mixtures thereof, with the proviso that when said cocatalyst does not contain a halide a halogen source is present, said process comprising the in-mold polymerization of a cycloolefin monomer containing at least one norbornene group, or a mixture of said monomers, to monomer conversion in excess of 95% as measured by thermogravimetric analysis; wherein the molar ratio of said cocatalyst on the basis of a metal(s) therein to said catalyst on the basis of a metal(s) therein is about 200:1 to 1:10.

23. Process of claim 22 wherein in the formula for the catalyst components, R radicals are individually selected from alkyl groups of 1 to 18 carbon atoms and said catalyst component is soluble in said monomer or a mixture of said monomers.

24. Process of claim 22 wherein said halogen source is selected from dimethylmonochlorosilane, dimethyldichlorosilane, diphenyldichlorosilane, tetrachlorosilane, and mixtures thereof.

25. Process of claim 24 which includes the step of mixing multiple streams containing said catalyst, said cocatalyst, said halogen source, and said monomer(s) to produce a reactive mixture, and the step of injecting said reactive mixture into a mold where said polymerization takes place to produce a thermoset polymer.

26. Process of claim 25 wherein said cocatalyst component is selected from the following:

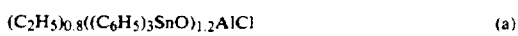 (a)

 (b)

 (c)

 (d)

27. Process of claim 24 wherein said halogen source is utilized in an amount from about 0.05 to about 10 millimoles per mole of said monomers.

28. A process for preparing a polymer by ring opening bulk polymerization in the presence of a metathesis catalyst system comprising the in-mole polymerization of a cycloolefin monomer containing a norbornene group, or a mixture thereof, to monomer conversion in excess of 95%, measured by thermogravimetric analysis, in the presence of an effective amount of a metathesis catalyst component and an effective amount of a metathesis cocatalyst component; said catalyst component is selected from organoammonium isopolymolybdates and organoammonium isopolytungstates defined as follows:

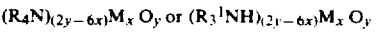

where O represents oxygen; M represents either molybdenum or tungsten; x and y represent the number of M and O atoms in the molecule based on the valence of +6 for molybdenum, +6 for tungsten, and −2 for oxygen; and the R and R¹ radicals can be same or different and are selected from hydrogen, alkyl, and alkylene groups each containing from 1 to 20 carbon atoms, and cycloaliphatic groups each containing from 5 to 16 carbon atoms; the sum of carbon atoms in R and R¹ radicals is large enough to render to catalyst component soluble in hydrocarbons and organic solvents; said cocatalyst component is selected from the group consisting of aluminum-stannoxalanes, aluminum-germoxalanes, aluminum plumboxalanes, dialuminoxanes, and mixtures thereof, with the proviso that when said cocatalyst does not contain a halide a halogen source is present; and said monomer is selected from norbornene, methylnorbornene, vinyl norbornene, ethylidenenorbornene, tetracyclododecene, methyl tetracyclododecene, dicyclopentadiene, trimer of cyclopentadiene, tetramer of cyclopentadiene, and mixtures thereof; the amount of said catalyst being about 0.01 to 50 millimoles of molybdenum or tungsten or tantalum per mole of total cycloolefin monomer and the molar ratio of said cocatalyst as metal(s) to said catalyst as molybdenum, tungsten or tantalum is in the range of about 200:1 to 1:10.

29. Process of claim 28 wherein in the formula for the catalyst components, R radicals are individually selected from alkyl groups of 1 to 18 carbon atoms and the sum of the carbons in all R radicals is 20 to 72; and $R^1$ radicals are individually selected from alkyl groups of 1 to 18 carbon atoms and the sum of the carbons in all $R^1$ radicals is 15 to 54.

30. Process of claim 28 wherein said halogen source is selected from dimethylmonochlorosilane, dimethyldichlorosilane, diphenyldichlorosilane, tetrachlorosilane, and mixtures thereof.

31. Process of claim 30 wherein said halogen source is utilized in an amount from about 0.05 to about 10 millimoles per mole of said monomers.

32. Process of claim 28 which includes the step of mixing multiple streams containing said catalyst, said cocatalyst, said halogen source, and said monomer(s) to produce a reactive mixture, and the step of injecting said reactive mixture into a mold where said polymerization takes place to produce a thermoset polymer.

33. Process of claim 19 wherein said cocatalyst component is selected from the following:

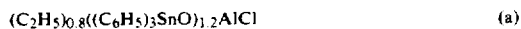  (a)

  (b)

  (c)

  (d)

* * * * *

UNITED STATES PATENT AND TRADEMARK OFFICE
CERTIFICATE OF CORRECTION

PATENT NO. : 5,155,188
DATED : October 13, 1992
INVENTOR(S) : Brian L. Goodall

It is certified that error appears in the above-identified patent and that said Letters Patent is hereby corrected as shown below:

Column 1, line 38, insert --of-- after "deactivation".

Column 3, line 5, the portions of the formulae in the chemical equation reading "$(CH_2H_5)_3$" and "$(CH_2H_5)_2$" should read --$(C_2H_5)_3$-- and --$(C_2H_5)_2$-- respectively.

Column 4, lines 19 and 20, "dihydrodicyllopentadienes" should read --dihydrodicyclopentadienes--.

Column 6, line 45, insert --of-- before "the" (first occurence).

Column 8, line 43, the open-end of the left hand bracket in the chemical formula should be reversed.

Column 14, line 34, "in-mole" should read --in-mold--.

Signed and Sealed this

Seventeenth Day of May, 1994

Attest:

BRUCE LEHMAN

Attesting Officer

Commissioner of Patents and Trademarks